United States Patent [19]
Jensen

[11] Patent Number: 6,166,174

[45] Date of Patent: *Dec. 26, 2000

[54] METHOD TO PREPARE PROCESSABLE POLYIMIDES WITH NON-REACTIVE ENDGROUPS USING 1,3-BIS(3-AMINOPHENOXY) BENZENE

[75] Inventor: Brian J. Jensen, Williamsburg, Va.

[73] Assignee: The United States of America as represented by the Administrator of the National Aeronautics and Space Administration, Washington, D.C.

[ * ] Notice: This patent is subject to a terminal disclaimer.

[21] Appl. No.: 09/368,606

[22] Filed: Aug. 5, 1999

Related U.S. Application Data

[60] Provisional application No. 60/096,792, Aug. 5, 1998.

[51] Int. Cl.$^7$ ............. C08F 283/04; C08F 6/00; C08F 8/00; C08G 73/10

[52] U.S. Cl. ............. 528/480; 528/125; 528/128; 528/172; 528/173; 528/176; 528/183; 528/185; 528/188; 528/220; 528/229; 528/350; 528/491; 528/492; 528/493; 524/600; 524/602; 524/607; 428/411.1; 428/473.5; 525/422; 525/436

[58] Field of Search ............. 528/125, 128, 528/172, 173, 176, 183, 185, 188, 220, 229, 350, 353, 480, 491, 492, 493; 428/473.5, 411.1; 525/422, 436; 524/600, 607, 602

[56] References Cited

U.S. PATENT DOCUMENTS

| | | | |
|---|---|---|---|
| 4,837,300 | 6/1989 | St. Clair et al. | 528/353 |
| 5,147,966 | 9/1992 | St. Clair et al. | 528/188 |
| 5,567,800 | 10/1996 | Hergenrother et al. | 528/353 |
| 5,639,850 | 6/1997 | Bryant | 528/353 |
| 5,644,022 | 7/1997 | Jensen | 528/353 |
| 5,866,676 | 2/1999 | Jensen | 528/353 |

*Primary Examiner*—P. Hampton-Hightower
*Attorney, Agent, or Firm*—Hillary W. Hawkins

[57] ABSTRACT

Polyimide copolymers were obtained containing 1,3-bis(3-aminophenoxy)benzene (APB) and other diamines and dianhydrides and terminating with the appropriate amount of a non-reactive endcapper, such as phthalic anhydride. Homopolymers containing only other diamines and dianhydrides which are not processable under conditions described previously can be made processable by incorporating various amounts of APB, depending on the chemical structures of the diamines and dianhydrides used. Polyimides that are more rigid in nature require more APB to impart processability than polyimides that are less rigid in nature. The copolymers that result from using APB to enhance processability have a unique combination of properties including: excellent thin film properties, low pressure processing (200 psi and below), improved toughness, improved solvent resistance, improved adhesive properties, improved composite mechanical properties, long term melt stability (several hours at 390 C.), and lower melt viscosities.

14 Claims, 1 Drawing Sheet

METHOD TO PREPARE PROCESSABLE POLYIMIDES WITH NON-REACTIVE ENDGROUPS USING 1,3-BIS(3-AMINOPHENOXY) BENZENE

CLAIM OF BENEFIT OF PROVISIONAL APPLICATION

Pursuant to 35 U.S.C. §119, the benefit of priority from provisional application 60/096,792, with a filing date of Aug. 5, 1998, is claimed for this non-provisional application.

ORIGIN OF THE INVENTION

The invention described herein was made by an employee of the United States Government and may be manufactured and used by or for the Government without the payment of any royalties thereon or therefor.

BACKGROUND OF THE INVENTION

1. Field of the Invention

The present invention relates to polyimide copolymers which contain 1,3-bis(3-aminophenoxy)benzene with non-reactive endgroups that are useful as adhesives, composite matrices, moldings, films and coatings.

2. Description of Related Art

Wholly aromatic polyimides are known for their exceptional thermal, thermo-oxidative and chemical resistance, but are generally difficult to process as structural adhesives or composite matrices. Several polyimides such as Kapton® (DuPont), PI-2080 (Dow Chemical, licensed to Lenzing), XU-218 (Ciba-Geigy), Ultem® (General Electric) and LaRC™-TPI (Mitsui Toatsu) are commercially available and used as fibers, films, moldings, adhesives or composite matrices.

Currently available equipment to process polyimides into useful parts are limited in their pressure and temperature capability and certain applications require co-curing of adhesives and composites with other structures such as foam or honeycomb. Because of the equipment limitations (especially autoclaves), it is extremely important to provide materials that are processable at 200 psi or below and 371° C. or below. Because of the foams and honeycombs that are being proposed for use in some applications, reductions in pressure below 200 psi are also very significant.

While improved processing conditions are very important, the polyimides must also display better mechanical and adhesive properties to meet the needs of future applications. Especially important for these applications are properties measured at temperatures of 177° C. or slightly higher for use over long time periods at those elevated temperatures.

Thermoplastic polymers currently available are either difficult to process into high quality parts or have limited mechanical performance at the elevated temperatures for short or long periods of time. The related art that comes closest to meeting the needs of future applications is a thermoplastic polyimide known as LARC™-IA, as described by St. Clair and Progar in U.S. Pat. No. 5,147,966. However, this polyimide requires higher processing conditions than desired and/or provides lower mechanical and adhesive properties than desired, depending on the tests performed.

An object of this invention is to provide polyimide copolymers of virtually any molecular weight.

Another object is to provide polyimides which can be processed at low pressures to provide polyimides with improved solvent resistance, modulus and elevated use temperatures.

Another object is to provide easily processable polyimide copolymers of molecular weight between ~5,000 and ~50,000 g/mole endcapped with non-reactive groups.

Another object is to provide polyimides with improved melt processability.

Another object is to provide a system that can be processed without the evolution of volatiles.

Another object is to provide a system that is melt stable at high temperatures.

Another object is to provide a system that has improved adhesive properties.

Another object is to provide a system that has improved composite properties.

SUMMARY OF THE INVENTION

According to the present invention, polyimide copolymers were obtained with different ratios of 1,3-bis(3-aminophenoxy)benzene (APB) and other diamines (such as, but not limited to, 3,4'-oxydianiline (3,4'-ODA) and 4,4'-oxydianiline (4,4'-ODA)) with dianhydrides (such as, but not limited to, 3,3',4,4'-biphenyltetracarboxylic dianhydride (BPDA), 3,3',4,4' benzophenone tetracarboxylic dianhydride (BTDA), and pyromellitic dianhydride (PMDA)) and endcapping with the appropriate amount of a non-reactive endcapper, such as phthalic anhydride (PA). Homopolymers containing only other diamines and dianhydrides which are not processable under conditions described previously can be made processable by incorporating various amounts of APB, depending on the chemical structures of the diamines and dianhydrides used. Polyimides that are more rigid in nature require more APB to impart processability than polyimides that are less rigid in nature. The copolymers that result from using APB to enhance processability have a unique combination of properties. This unique combination of properties includes excellent thin film properties (Table 2), low pressure processing (200 psi and below) (Table 3), improved toughness (Table 4), improved solvent resistance (Table 5), improved adhesive properties (Table 5), improved composite mechanical properties (Table 6), long term melt stability (several hours at 390° C.) (Table 7), and lower melt viscosities (Table 8). The general synthetic procedure for a copolymer designated LARC™-8515 with 85% ODA and 15% APB at a theoretical molecular weight of ~9200 g/mole (5% stoichiometric offset) is shown in FIG. 1. Data for theoretical number average molecular weights (Mn), inherent viscosities (ηinh) and glass transition, melting and 5% weight loss temperatures are also included in Table 1. Thin film properties are included in Table 2. Polymer processability data is included in Table 3. Fracture toughness and fracture energy are included in Table 4. Data for titanium to titanium adhesive properties are included in Table 5. Data for composite properties are included in Table 6. Data for melt viscosities are included in Tables 7 and 8. These copolyimides are eminently suitable as adhesives, composite matrices, moldings, films and coatings.

The advantage of these copolyimides compared to other linear polyimides is the unique combination of high mechanical properties and easy processing into useful parts. These copolyimides have excellent solvent resistance, high glass transition temperature and high modulus but are processable under low pressures and short times. This combination of properties is unique and is unexpected for these polyimides. The dianhydrides used herein contain a rigid structure which typically provides polyimides with poor processability. The addition of the highly flexible APB diamine provides the improved processability while the rigid structure provides high modulus, improved solvent resistance and improved mechanical properties. These properties are important for applications as films, coatings, moldings, adhesives and composites.

DESCRIPTION OF THE PREFERRED EMBODIMENTS

Figure 1:
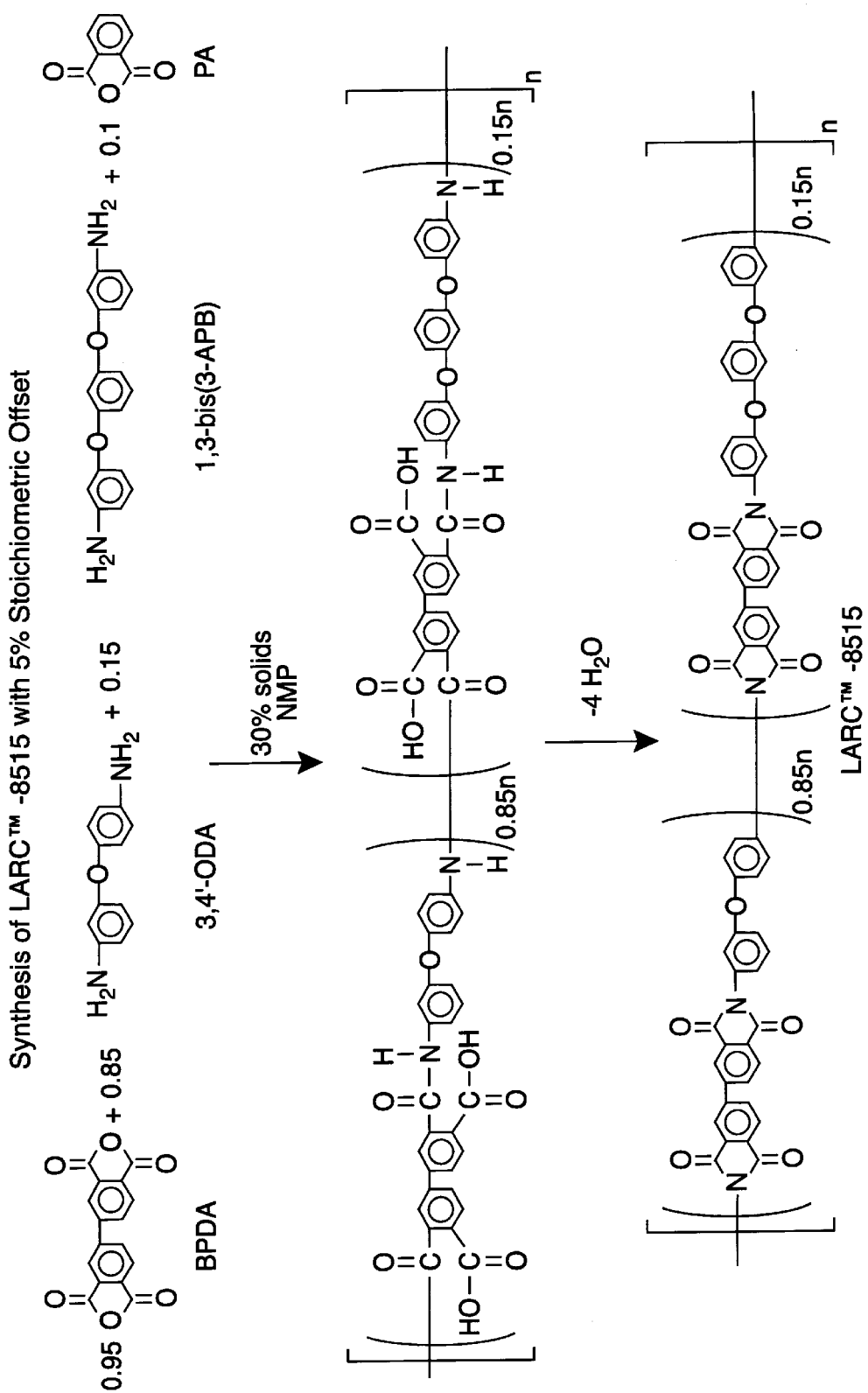
FIG. 1 is an equation showing the synthesis of LARC™ 8515 with 5% stoichiometric offset.

Phthalimide-terminated imide oligomers with a wide range of molecular weights (~5000 to ~50,000 g/mole) are readily prepared by offsetting the ratio of one monomer relative to the other by a calculated amount and adding an appropriate amount of phthalic anhydride, a non-reactive endcapper. The low molecular weight versions of these materials have better processability than the high molecular weight versions but may form brittle films, while the high molecular weight versions have higher Tgs and better mechanical properties than the low molecular weight versions and form tough, creasible films. Furthermore, copolymers with higher amounts of APB have better processability but lower Tgs while copolymers with lower amounts of APB have higher Tgs but poorer processability. The temperatures and pressures used to process these materials are limited by equipment available while the mechanical properties desired are based on current or future applications. The copolymers discussed herein have a unique combination of properties which allow them to be processed on currently available equipment at very low pressures but meet these desired mechanical properties. Therefore, the copolymers can be designed with the proper combination of properties for the desired application by controlling the ratio of the amine monomers, specifically the amount of APB and the molecular weight. The copolymers are designated, for example, as 95/05 3,4'-ODA/APB/BPDA with PA @ 11,600 g/mole, corresponding to a copolymer containing 95% 3,4'-ODA and 5% APB reacted with BPDA and encapped with PA at a theoretical number average molecular weight (Mn) of 11,600 g/mole. Specific examples follow.

EXAMPLE 1

Synthesis of 95/05 3,4'-ODA/APB//BPDA with PA @ 11,600 g/mole

The following example illustrates the synthesis of a phthalimide-terminated imide oligomer with theoretical number average molecular weight of 11,600 g/mole. 3,4'-Oxydianiline (ODA) (47.5 mmole, 9.5117 g) and 1,3-bis(3-aminophenoxy)benzene (APB) (2.50 mmole, 0.7308 g) were dissolved in N-methylpyrrolidinone (NMP) (~35 mL) in a flask equipped with a mechanical stirrer, condenser and nitrogen inlet. 3,3',4,4'-Biphenyl tetracarboxylic dianhydride (BPDA) (48.043 mmole, 14.1354 g) and phthalic anhydride (PA) (3.914 mmole, 0.5797 g) were slurried in NMP (~35 mL) and were added to the solution. After washing with ~30 mL of NMP to provide a 20% solids content reaction, an exotherm of 10–15° C. was observed. The exotherm quickly subsided and the reaction was stirred at 25° C. for 16 h to form the phthalamide acid-terminated polyamide acid. The inherent viscosity (ηinh)) of the phthalamide acid-terminated polyamide acid was 0.54 dL/g in NMP at 25° C. To imidize, toluene (30 mL) was added and the reaction was heated at 160° C. for 24 h. After cooling, a powder precipitated which was washed twice in water and dried at ~230° C. in a vacuum to afford a yellow solid in high yield. The resulting phthalimide-terminated polyimide was insoluble in NMP and had a glass transition temperature 253° C. and melting endotherms at ~340 and ~373° C. A film cast from the polyamide acid solution and dried 1 hour each at 100, 225, and 371° C. had a Tg of 253° C. and a Tm at 340° C. and 373° C. and was tough and creasible.

EXAMPLE 2

Synthesis of 85/15 3,4'-ODA/APB//BPDA with PA @ 11,600 g/mole

The following example illustrates the synthesis of a phthalimide-terminated imide oligomer with theoretical number average molecular weight of 11,600 g/mole. 3,4'-Oxydianiline (ODA) (63.75 mmole, 12.7653 g) and 1,3-bis (3-aminophenoxy)benzene (APB) (11.25 mmole, 3.2888 g) were dissolved in N-methylpyrrolidinone (NMP) (~50 mL) in a flask equipped with a mechanical stirrer, condenser and nitrogen inlet. 3,3',4,4'-Biphenyl tetracarboxylic dianhydride (BPDA) (72.0 mmole, 21.1838 g) and phthalic anhydride (PA) (6.0 mmole, 0.8888 g) were slurried in NMP (~50 mL) and were added to the solution. After washing with ~32 mL of NMP to provide a 20% solids content reaction, an exotherm of 10–15° C. was observed. The exotherm quickly subsided and the reaction was stirred at 25° C. for 16 h to form the phthalamide acid-terminated polyamide acid. The inherent viscosity (ηinh)) of the phthalamide acid-terminated polyamide acid was 0.47 dL/g in NMP at 25° C. To imidize, toluene (30 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP and had a glass transition temperature 245° C. and a melting point at ~357° C. A film cast from the polyamide acid solution and dried 1 hour each at 100, 225, and 371° C. had a Tg of 248° C. and a Tm at 357° C. and was tough and creasible.

EXAMPLE 3

Synthesis of 70/30 3,4'-ODA/APB//BPDA with PA @ 11,600 g/mole

The following example illustrates the synthesis of a phthalimide-terminated imide oligomer with theoretical number average molecular weight of 11,600 g/mole. 3,4'-Oxydianiline (ODA) (35.0 mmole, 7.0086 g) and 1,3-bis(3-aminophenoxy)benzene (APB) (15.0 mmole, 4.3850 g) were dissolved in N-methylpyrrolidinone (NMP) (~35 mL) in a flask equipped with a mechanical stirrer, condenser and nitrogen inlet. 3,3',4,4'-Biphenyl tetracarboxylic dianhydride (BPDA) (47.95 mmole, 14.1075 g) and phthalic anhydride (PA) (4.104 mmole, 0.6079 g) were slurried in NMP (~35 mL) and were added to the solution. After washing with ~34 mL of NMP to provide a 20% solids content reaction, an exotherm of 10–15° C. was observed. The exotherm quickly subsided and the reaction was stirred at 25° C. for 16 h to form the phthalamide acid-terminated polyamide acid. The inherent viscosity (ηinh) of the phthalamide acid-terminated polyamide acid was 0.49 dL/g in NMP at 25° C. To imidize, toluene (30 mL) was added and the reaction was heated at 160° C. for 24 h. After cooling to 25°

C., the polymer was still soluble. The solution was poured into water to precipitate a powder which was washed twice in water and dried at ~230° C. in a vacuum to afford a yellow solid in high yield. The resulting phthalimide-terminated polyimide was soluble in NMP and had a glass transition temperature 230° C. A film cast from the polyamide acid solution and dried 1 hour each at 100, 225, and 371° C. had a Tg of 230° C. and was tough and creasible.

EXAMPLE 4

Synthesis of 50/50 3,4'-ODA/APB//BPDA with PA @ 11,600 g/mole

The following example illustrates the synthesis of a phthalimide-terminated imide oligomer with theoretical number average molecular weight of 11,600 g/mole. 3,4'-Oxydianiline (ODA) (25.0 mmole, 5.0062 g) and 1,3-bis(3-aminophenoxy)benzene (APB) (25.0 mmole, 7.3084 g) were dissolved in N-methylpyrrolidinone (NMP) (~35 mL) in a flask equipped with a mechanical stirrer, condenser and nitrogen inlet. 3,3',4,4'-Biphenyl tetracarboxylic dianhydride (BPDA) (47.87 mmole, 14.0845 g) and phthalic anhydride (PA) (4.260 mmole, 0.6310 g) were slurried in NMP (~35 mL) and were added to the solution. After washing with ~38 mL of NMP to provide a 20% solids content reaction, an exotherm of 10–15° C. was observed. The exotherm quickly subsided and the reaction was stirred at 25° C. for 16 h to form the phthalamide acid-terminated polyamide acid. The inherent viscosity ($\eta$inh) of the phthalamide acid-terminated polyamide acid was 0.49 dL/g in NMP at 25° C. To imidize, toluene (30 mL) was added and the reaction was heated at 160° C. for 24 h. After cooling to 25° C., the polymer was still soluble. The solution was poured into water to precipitate a powder which was washed twice in water and dried at ~230° C. in a vacuum to afford a yellow solid in high yield. The resulting phthalimide-terminated polyimide was soluble in NMP and had a glass transition temperature 219° C. A film cast from the polyamide acid solution and dried 1 hour each at 100, 225, and 371° C. had a Tg of 223° C. and was tough and creasible.

EXAMPLE 5

Synthesis of 85/15 3,4'-ODA/APB//BPDA with PA @ 8500 g/mole

The following example illustrates the synthesis of a phthalimide-terminated imide oligomer with theoretical number average molecular weight of 8,500 g/mole. 3,4'-Oxydianiline (ODA) (1.70 mole, 340.42 g) and 1,3-bis(3-aminophenoxy)benzene (APB) (0.30 mole, 87.70 g) were dissolved in N-methylpyrrolidinone (NMP) (~900 mL) in a flask equipped with a mechanical stirrer, condenser and nitrogen inlet. 3,3',4,4'-Biphenyl tetracarboxylic dianhydride (BPDA) (1.8918 mole, 556.61 g) and phthalic anhydride (PA) (0.2164 mole, 32.053 g) were slurried in NMP (~900 mL) and were added to the solution. After washing with ~573 mL of NMP to provide a 30% solids content reaction, an exotherm of 10–15° C. was observed. The exotherm quickly subsided and the reaction was stirred at 25° C. for 16 h to form the phthalamide acid-terminated polyamide acid. The inherent viscosity ($\eta$inh) of the phthalamide acid-terminated polyamide acid was 0.41 dL/g in NMP at 25° C. To imidize, toluene (100 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP and had a glass transition temperature 230° C. A film cast from the polyamide acid solution and dried 1 hour each at 100, 225, and 371° C. had a Tg of 231° C. and was brittle.

EXAMPLE 6

Synthesis of 85/15 3,4'-ODA/APB//BPDA with PA @ 9000 g/mole

The following example illustrates the synthesis of a phthalimide-terminated imide oligomer with theoretical number average molecular weight of 9,000 g/mole. 3,4'-Oxydianiline (ODA) (85.0 mmole, 17.0209 g) and 1,3-bis(3-aminophenoxy)benzene (APB) (15.0 mmole, 4.3850 g) were dissolved in N-methylpyrrolidinone (NMP) (~75 mL) in a flask equipped with a mechanical stirrer, condenser and nitrogen inlet. 3,3',4,4'-Biphenyl tetracarboxylic dianhydride (BPDA) (94.89 mmole, 27.9189 g) and phthalic anhydride (PA) (10.22 mmole, 1.5138 g) were slurried in NMP (~75 mL) and were added to the solution. After washing with ~53 mL of NMP to provide a 20% solids content reaction, an exotherm of 10–15° C. was observed. The exotherm quickly subsided and the reaction was stirred at 25° C. for 16 h to form the phthalamide acid-terminated polyamide acid. The inherent viscosity ($\eta$inh) of the phthalamide acid-terminated polyamide acid was 0.43 dL/g in NMP at 25° C. To imidize, toluene (40 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP, had a glass transition temperature 237° C. and melting endotherms of 324 and 350° C. A film cast from the polyamide acid solution and dried 1 hour each at 100, 225, and 371° C. had a Tg of 235° C. and a Tm at 324° C. and 350° C. and was tough.

EXAMPLE 7

Synthesis of 85/15 3,4'-ODA/APB//BPDA with PA @ 23,400 g/mole

The following example illustrates the synthesis of a phthalimide-terminated imide oligomer with theoretical number average molecular weight of 23,400 g/mole. 3,4'-Oxydianiline (ODA) (42.5 mmole, 8.5105 g) and 1,3-bis(3-aminophenoxy)benzene (APB) (7.5 mmole, 2.1925 g) were dissolved in N-methylpyrrolidinone (NMP) (~35 mL) in a flask equipped with a mechanical stirrer, condenser and nitrogen inlet. 3,3',4,4'-Biphenyl tetracarboxylic dianhydride (BPDA) (49.0 mmole, 14.4170 g) and phthalic anhydride (PA) (2.0 mmole, 0.2962 g) were slurried in NMP (~35 mL) and were added to the solution. After washing with ~32 mL of NMP to provide a 20% solids content reaction, an exotherm of 10–15° C. was observed. The exotherm quickly subsided and the reaction was stirred at 25° C. for 16 h to form the phthalamide acid-terminated polyamide acid. The inherent viscosity ($\eta$inh)) of the phthalamide acid-terminated polyamide acid was 0.68 dL/g in NMP at 25° C. To imidize, toluene (30 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP and had a glass transition temperature 248° C. A film cast from the polyamide acid solution and dried 1 hour each at 100, 225, and 371° C. had a Tg of 252° C. and was tough and creasible.

EXAMPLE 8

Synthesis of 50/50 4,4'-ODA/APB//PMDA with PA
@ 12,000 g/mole

The following example illustrates the synthesis of a phthalimide-terminated imide oligomer with theoretical number average molecular weight of 12,000 g/mole. 4,4'-Oxydianiline (4,4'-ODA) (20.00 mmole, 4.0049 g) and 1,3-bis(3-aminophenoxy)benzene (APB) (20.00 mmole, 5.8467 g) were dissolved in N-methylpyrrolidinone (NMP) (~35 mL) in a flask equipped with a mechanical stirrer, condenser and nitrogen inlet. Pyromellitic dianhydride (PMDA) (38.596 mmole, 8.4187 g) and phthalic anhydride (PA) (2.808 mmole, 0.4159 g) were added to the solution with enough NMP to total 74.8 g (20% solids). The reaction was stirred at 25° C. for 6 h to form the phthalamide acid-terminated polyamide acid. The inherent viscosity ($\eta$inh) of the phthalamide acid-terminated polyamide acid was 0.50 dL/g in NMP at 25° C. To imidize, toluene (40 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP and had a glass transition temperature 243° C. A film cast from the polyamide acid solution and dried 1 hour each at 100, 225, and 371° C. had a Tg of 252° C. and was brittle.

EXAMPLE 9

Synthesis of 20/80 4,4'-ODA/APB//PMDA with PA
@ 12,000 g/mole

The following example illustrates the synthesis of a phthalimide-terminated imide oligomer with theoretical number average molecular weight of 12,000 g/mole. 4,4'-Oxydianiline (4,4'-ODA) (8.00 mmole, 1.6020 g) and 1,3-bis(3-aminophenoxy)benzene (APB) (32.00 mmole, 9.3547 g) were dissolved in N-methylpyrrolidinone (NMP) (~35 mL) in a flask equipped with a mechanical stirrer, condenser and nitrogen inlet. Pyromellitic dianhydride (PMDA) (38.51 mmole, 8.3994 g) and phthalic anhydride (PA) (2.980 mmole, 0.4414 g) were added to the solution with enough NMP to total 79.2 g (20% solids). The reaction was stirred at 25° C. for 6 h to form the phthalamide acid-terminated polyamide acid. The inherent viscosity ($\eta$inh) of the phthalamide acid-terminated polyamide acid was 0.36 dL/g in NMP at 25° C. To imidize, toluene (40 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP and had a glass transition temperature 218° C. and a small Tm at 331° C. A film cast from the polyamide acid solution and dried 1 hour each at 100, 225, and 371° C. had a Tg of 240° C. and was tough.

EXAMPLE 10

Synthesis of 90/10 3,4'-ODA/APB//BTDA with PA
@ 12,000 g/mole

The following example illustrates the synthesis of a phthalimide-terminated imide oligomer with theoretical number average molecular weight of 12,000 g/mole. 3,4'-Oxydianiline (3,4'-ODA) (36.00 mmole, 7.2089 g) and 1,3-bis(3-aminophenoxy)benzene (APB) (4.00 mmole, 1.1693 g) were dissolved in N-methylpyrrolidinone (NMP) (~35 mL) in a flask equipped with a mechanical stirrer, condenser and nitrogen inlet. 3,3',4,4'-Benzophenone tetracarboxylic dianhydride (BTDA) (38.38 mmole, 12.3673 g) and phthalic anhydride (PA) (3.240 mmole, 0.4799 g) were added to the solution with enough NMP to total 84.9 g (20% solids). The reaction was stirred at 25° C. for 6 h to form the phthalamide acid-terminated polyamide acid. The inherent viscosity ($\eta$inh) of the phthalamide acid-terminated polyamide acid was 0.43 dL/g in NMP at 25° C. To imidize, toluene (40 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP and a glass transition temperature could not be detected while a melting endotherm peaked at 392° C. A film cast from the polyamide acid solution and dried 1 hour each at 100, 225, and 371° C. had a Tg of 252° C., a sharp Tm at 394° C. and was brittle.

EXAMPLE 11

Synthesis of 50/50 3,4'-ODA/APB//BTDA with PA
@ 12,000 g/mole

The following example illustrates the synthesis of a phthalimide-terminated imide oligomer with theoretical number average molecular weight of 12,000 g/mole. 3,4'-Oxydianiline (3,4'-ODA) (20.00 mmole, 4.0049 g) and 1,3-bis(3-aminophenoxy)benzene (APB) (20.00 mmole, 5.8467 g) were dissolved in N-methylpyrrolidinone (NMP) (~35 mL) in a flask equipped with a mechanical stirrer, condenser and nitrogen inlet. 3,3',4,4'-Benzophenone tetracarboxylic dianhydride (BTDA) (38.264 mmole, 12.3300 g) and phthalic anhydride (PA) (3.472 mmole, 0.5143 g) were added to the solution with enough NMP to total 90.8 g (20% solids). The reaction was stirred at 25° C. for 6 h to form the phthalamide acid-terminated polyamide acid. The inherent viscosity ($\eta$inh) of the phthalamide acid-terminated polyamide acid was 0.38 dL/g in NMP at 25° C. To imidize, toluene (40 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP and had a glass transition temperature 212° C. A film cast from the polyamide acid solution and dried 1 hour each at 100, 225, and 371° C. had a Tg of 222° C. and was tough and creasible.

EXAMPLE 12

Synthesis of 50/50 3,4'-ODA/APB//PMDA with PA
@ 12,000 g/mole

The following example illustrates the synthesis of a phthalimide-terminated imide oligomer with theoretical number average molecular weight of 12,000 g/mole. 3,4'-Oxydianiline (3,4'-ODA) (20.00 mmole, 4.0049 g) and 1,3-bis(3-aminophenoxy)benzene (APB) (20.00 mmole, 5.8467 g) were dissolved in N-methylpyrrolidinone (NMP) (~35 mL) in a flask equipped with a mechanical stirrer, condenser and nitrogen inlet. Pyromellitic dianhydride (PMDA)] (38.596 mmole, 8.4187 g) and phthalic anhydride (PA) (2.808 mmole, 0.4159 g) were added to the solution with enough NMP to total 74.8 g (20% solids). The reaction was stirred at 25° C. for 6 h to form the phthalamide acid-terminated polyamide acid. The inherent viscosity ($\eta$inh) of the phthalamide acid-terminated polyamide acid was 0.40 dL/g in NMP at 25° C. To imidize, toluene (40 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP and had a glass transition temperature 250° C. A film cast from the polyamide acid solution and dried 1 hour each at 100, 225, and 371° C. had a Tg of 252 and a small Tm at 400° C. and was brittle.

EXAMPLE 13

Synthesis of 20/80 3,4'-ODA/APB//PMDA with PA @ 12,000 g/mole

The following example illustrates the synthesis of a phthalimide-terminated imide oligomer with theoretical number average molecular weight of 12,000 g/mole 3,4'-Oxydianiline (3,4'-ODA) (8.00 mmole, 1.6020 g) and 1,3-bis(3-aminophenoxy)benzene (APB) (32.00 mmole, 9.3547 g) were dissolved in N-methylpyrrolidinone (NMP) (~35 mL) in a flask equipped with a mechanical stirrer, condenser and nitrogen inlet. Pyromellitic dianhydride (PMDA) (38.510 mmole, 8.3994 g) and phthalic anhydride (PA) (2.980 mmole, 0.4414 g) were added to the solution with enough NMP to total 79.2 g (20% solids). The reaction was stirred at 25° C. for 6 h to form the phthalamide acid-terminated polyamide acid. The inherent viscosity (ηinh) of the phthalamide acid-terminated polyamide acid was 0.36 dL/g in NMP at 25° C. To imidize, toluene (40 mL) was added and the reaction was heated at 160° C. for 24 h. After cooling, a powder precipitated which was washed twice in water and dried ~230° C. in a vacuum to afford a yellow solid in high yield. The resulting phthalimide-terminated polyimide was insoluble in NMP and had a glass transition temperature of 218° C. and a small Tm at 400° C. A film cast from the polyamide acid solution and dried 1 hour each at 100, 225, and 371° C. had a Tg of 231° C. and was tough and creasible.

EXAMPLE 14

Preparation of Moldings

The following process was used to test the compression molding of the aforementioned examples. Dried powders of the polyimide copolymers (1–1.5 gram) were placed in a 1 or 1.25 inch stainless steel mold which was placed in a preheated hydraulic press. The molds were heated to 371° C. and pressure was applied. The pressure and temperature were held constant for 0.5 hours. The results are presented in Table 3. "Poor processability" means inadequate flow and an unconsolidated molding. "Good processability" means a consolidated molding but little molding flash. "Excellent processability" means a well consolidated molding with a lot of molding flash indicating lower pressures would probably provide well consolidated, void free moldings. "Excessive" means the majority of the polymer flowed out of the mold leaving only a thin molding or film.

EXAMPLE 15

Preparation of Adhesive Tape

A solution of the composition of Example 6, i.e. 20% solids in NMP, was used to prepare an adhesive tape as follows. The solution was applied to style 112, A1100 finish E-glass cloth which had been dried for 0.5 hours in a forced air oven. Said coated cloth was air dried 1 hour each at 100, 175 and 225° C. between application of subsequent coats. This procedure was continued until a nominal thickness of 0.012 inch was obtained. The area to be bonded was coated (primed) on each adherend with a dilute solution (~5% solids) of the same composition as the adhesive tape and air dried 1 hour each at 100, 175 and 225° C. prior to bonding with the adhesive tape.

EXAMPLE 16

Adhesive Bonding

The prepared adhesive tape from Example 15 was cut into strips sufficient to cover the bond area so as to give a 0.5 inch overlap for surface-treated (Pasa Jell 107) titanium alloy (Ti-6Al-4V) four fingered panel adherends. Each tape was placed between the overlapped panels and the specimens were assembled in a bonding jig in such a manner as to hold the specimens securely while being bonded. The assembly was placed in a hydraulic press and 85 to 150 psi pressure was applied. The temperature, monitored by a thermocouple, was increased from room temperature to 371° C. during ~45 minutes and held for 1 hour while pressure was maintained. The heat was turned off and the press was allowed to cool under pressure to <150° C. The bonded panel was removed from the press and jig and the individual specimens were separated with a metal shearer. The lap shear strengths were determined according to the procedure for ASTM-1002. Results are given in Table 5.

EXAMPLE 17

Preparation of Graphite Fiber with Polymer Coating

A solution of polymer from Examples 2 and 5 was coated onto continuous graphite fiber (Hercules, Inc., IM-7). After coating, the wet fiber was dried in ovens to remove most of the solvent and convert to poly(amide) acid to polyimide. The polymer-solids-to-graphite-fiber ratio was approximately one to two. These prepregs were held for composite fabrication.

EXAMPLE 18

Preparation of Graphite Fiber Reinforced Composite

The prepregs from Example 17 were cut into three inch square pieces and placed in a three inch by three inch matched-metal-die mold with the fiber all aligned in the same direction (unidirectional). Ten plies of the prepreg were stacked in this manner and the mold was placed in a heated hydraulic press. The mold was heated to 225° C. for 1 hour, then heated to 371° C. with 200 psi pressure applied after 5 minutes at 371° C. and held for 1 hour at 371° C. After cooling to ambient conditions, the pressure was released and a well consolidated composite part was removed from the mold. The resin content of the molded composite was calculated to be approximately 33 percent. Composite properties are presented in Table 6.

EXAMPLE 19

Measurement of Melt Viscosity and Melt Stability

The polyimide copolymers were subjected to melt rheology measurements using the Rheometrics System IV rheometer and a Brabender equipped with a Mixer Measuring Head. Data for the polymer described in Example 2 from the Brabender is presented in Table 7. Torque is a measure of the force needed to mix the polymers and is directly related to viscosity at the temperatures shown. Data from the Rheometrics System IV rheometer for several of the copolymers is shown in Table 8.

EXAMPLE 20

Preparation of Glass Coating

The phthalamide acid-terminated polyamide acid solutions were poured onto glass plates and spread to a uniform thickness using a doctors blade with a preset gap. After drying to a tack free form in a dust free atmosphere, the polymers were heated 1 hour each at 100, 200 and 371° C. to form a polyimide coating with high adhesion to the glass plate.

EXAMPLE 21

Preparation of Wire Coating

Steel and copper wires were dipped into the phthalamide acid-terminated polyamide acid solutions and removed to form a polymer/solvent coating on the wires. After drying to a tack free form in a dust free atmosphere, the polymers were heated 1 hour each at 100, 200 and 371° C. to form a tough, flexible, polyimide coating with high adhesion to the steel or copper wire.

TABLE 1

Properties of Copolymers

| Copolymer (Theoretical Molecular Weight, Mn) | Inherent Viscosity, ($\eta$inh) | Glass Transition Temperature, Tg (° C.) | Temperature at 5% Weight Loss, ° C. | |
|---|---|---|---|---|
| | | | Air | Nitrogen |
| Example 5 | 0.41 | 230 | 509 | 515 |
| Example 6 | 0.43 | 234 (324, 350) | 509 | 515 |
| Example 2 | 0.47 | 248 (357) | 508 | 513 |
| Example 7 | 0.68 | 252 | 511 | 519 |
| Example 4 | 0.41 | 219 | 503 | 508 |
| Example 3 | 0.46 | 230 | 497 | 499 |
| Example 1 | 0.49 | 254 (340, 373) | 502 | 513 |

TABLE 2

Thin Film Properties of Copolymers*.

| Copolymer | Test Temperature, ° C. | Tensile Strength, Ksi | Tensile Modulus, Ksi | Elongation, % |
|---|---|---|---|---|
| Example 2 | 25 | 21.9 | 492 | 83 |
| | 150 | 12.7 | 312 | 92 |
| | 177 | 11.3 | 301 | 109 |
| Example 3 | 25 | 18.5 | 478 | 32 |
| | 177 | 9.1 | 340 | 77 |
| Example 1 | 25 | 19.2 | 555 | 17 |
| | 177 | 10.0 | 400 | 40 |

*Theoretical molecular weight of 11600 g/mole

TABLE 3

Polymer Processability.

| Copolymer | Pressure(psi) | Processability/Quality |
|---|---|---|
| Example 1 | 200 | poor/brittle |
| Example 2 | 125 | good/tough |
| Example 3 | 125 | excellent/tough |
| Example 4 | 125 | excellent/tough |
| Example 5 | 85 | good/brittle |
| Example 6 | 125 | excellent/tough |
| Example 7 | 200 | poor/tough |
| Example 8 | 200 | poor/tough |
| Example 9 | 50 | excellent/tough |
| Example 10 | 200 | poor/tough |
| Example 11 | 50 | very good/tough |
| Example 12 | 200 | poor, tough |
| Example 13 | 50 | excellent/tough |

TABLE 4

Fracture Toughness and Energy.

| Copolymer | Fracture toughness, psi in½ | Fracture energy, in lbs/in² |
|---|---|---|
| Example 5 | 1100 | 2.4 |
| Example 6 | 2700 | 14.6 |
| Example 2 | 4000 | 32 |

TABLE 5

Adhesive Properties of Example 6 Bonded 1h at 371° C. under 85 psi.

| Test Temp, ° C. | Exposure | Bondline thickness, mil | Strength, psi | Failure Mode |
|---|---|---|---|---|
| RT | none | 6–10 | 5720 | Coh |
| 177° C. | none | 5–7 | 4310 | Coh |
| 204° C. | none | 6–8 | 3360 | Coh |
| RT | MEK, 48 h | 7–11 | 5584 | 80% Coh |
| RT | Toluene, 48 h | 9–12 | 4675 | 50% Coh |
| RT | JP-5, 48 h | 6–10 | 6127 | 80% Coh |
| RT | Hydraulic Fluid, 48 h | 6–7 | 5512 | 80% Coh |
| 177° C. | MEK, 48h | 4–6.5 | 4175 | Coh |
| 177° C. | Toluene, 48 h | 4.4–6.3 | 4200 | Coh |
| 177° C. | JP-5, 48 h | 5.5–7 | 4342 | 80% Coh |
| 177° C. | Hydraulic Fluid, 48 h | 6–7 | 4042 | 90% Coh |

TABLE 6

Composite Properties of Copolymers.[a]

| Copolymer | Test Temp., ° C. | Short Beam Shear, Strength,[b] Ksi | Flex Strength,[b] Ksi | Flex Modulus,hu b Msi | Open Hole Compression Strength,[c] Ksi |
|---|---|---|---|---|---|
| Example 5 | 25 | 18.6 | 280 | 22 | 60.9 |
| | 93 | 15.4 | 250 | 21 | |
| | 150 | 10.7 | 224 | 18 | |
| | 177 | 11.2 | 214 | 22 | |
| Example 2 | 25 | 14.8 | 318 | 18 | 56.9 |
| | 93 | 13.3 | 253 | 21 | |
| | 150 | 11.7 | 232 | 23 | |
| | 177 | 10.6 | 211 | 22 | |

[a]Composites processed at 150 psi and 371° C.
[b]Unidirectional specimen layup.
[c]Specimen layup: [±45/90/0/0/±45/0/0/±45/0]$_s$.

TABLE 7

Polymer Melt Viscosity as Measured by Torque* of Example 2 at Various Temperatures and Times.

| Temperature, ° C. | Torque, mg after 10 min | Torque, mg after 120 min | Torque, mg after 240 min |
|---|---|---|---|
| 340 | 1500 | | |
| 350 | 1000 | | |
| 360 | 450 | 700 | 1000 |
| 370 | 350 | | |
| 375 | 325 | | |

*See Example 19.

TABLE 8

Minimum Melt Viscosity* of Several Copolyimides Heated From Room Temperature to 371° C.

| Copolymer | Minimum Melt Viscosity, Poise |
| --- | --- |
| Example 8 | Remained Solid-Like |
| Example 9 | $1.7 \times 10^3$ |
| Example 10 | Remained Solid-Like |
| Example 11 | $1.2 \times 10^4$ |
| Example 12 | Remained Solid-Like |
| Example 13 | $1 \times 10^3$ |

*See Example 19.

What is claimed is:

1. A method to increase the processability of polyimides, which comprises:

reacting 1,3-bis(3-aminophenoxy)benzene with a high melt viscosity polyimide made from a diamine and a dianhydride, and terminating the reaction with an effective amount of a non-reactive endcapper.

2. The method to increase the processability of polyimides as in claim 1 wherein said diamine is selected from the group comprising 3,4'-oxydianiline or 4,4'-oxydianiline.

3. The method to increase the processability of polyimides as in claim 1 wherein said dianhydride is selected from the group comprising 3,3',4,4'-biphenylcarboxylic dianhydride, benzophenone tetracarboxylic dianhydride, or pyrromellitic dianhydride.

4. The method to increase the processability of polyimides as in claim 1 wherein said non-reactive endcapper is phthalic anhydride.

5. The method to increase the processability of polyimides as in claim 1 wherein the mixture of said diamine and 1,3-bis(3-aminophenoxy)benzene has a ratio of said diamine to 1,3-bis(3-aminophenoxy)benzene within the range of about 1:99 to about 99:1.

6. The method to increase the processability of polyimides as in claim 5 wherein said ratio of said diamine to 1,3-bis (3-aminophenoxy)benzene is within the range of about 10:90 to about 90:10.

7. The method to increase the processability of polyimides as in claim 1 wherein the polyimide has a number average molecular weight within the range of about 5000 to 50,000 g/mole.

8. A molding prepared from a processable polyimide according to claim 1.

9. A film prepared from a processable polyimide according to claim 1.

10. An adhesive prepared from a processable polyimide according to claim 1.

11. A graphite composite prepared from a processable polyimide according to claim 1.

12. A composite of glass fibers or organic fibers prepared from the processable polyimide according to claim 1.

13. A coating composition on glass plates prepared from the processable polyimide according to claim 1.

14. A wire coating composition on steel or copper wire prepared from a processable polyimide according to claim 1.

* * * * *